(12) United States Patent
Miyajima

(10) Patent No.: US 11,352,049 B2
(45) Date of Patent: Jun. 7, 2022

(54) POWER STEERING APPARATUS

(71) Applicant: HITACHI AUTOMOTIVE SYSTEMS, LTD., Hitachinaka (JP)

(72) Inventor: Tsukasa Miyajima, Atsugi (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 510 days.

(21) Appl. No.: 16/482,658

(22) PCT Filed: Feb. 14, 2018

(86) PCT No.: PCT/JP2018/004979
§ 371 (c)(1),
(2) Date: Jul. 31, 2019

(87) PCT Pub. No.: WO2018/163724
PCT Pub. Date: Sep. 13, 2018

(65) Prior Publication Data
US 2019/0344823 A1    Nov. 14, 2019

(30) Foreign Application Priority Data
Mar. 9, 2017   (JP) .............................. JP2017-044458

(51) Int. Cl.
*B62D 5/04*    (2006.01)
*B62D 6/00*    (2006.01)
*B62D 15/02*   (2006.01)

(52) U.S. Cl.
CPC ......... *B62D 5/0409* (2013.01); *B62D 5/0466* (2013.01); *B62D 6/002* (2013.01); *B62D 15/021* (2013.01)

(58) Field of Classification Search
CPC .... B62D 5/0409; B62D 5/0466; B62D 6/002; B62D 15/021
See application file for complete search history.

(56) References Cited

U.S. PATENT DOCUMENTS

2009/0271069 A1    10/2009   Yamamoto et al.

FOREIGN PATENT DOCUMENTS

| JP | 62241768 A | * 10/1987 |
| JP | 2007-099053 A | 4/2007 |

(Continued)

OTHER PUBLICATIONS

International Search Report dated Mar. 27, 2018 in International Application No. PCT/JP2018/004979.

(Continued)

*Primary Examiner* — Jacob D Knutson
(74) *Attorney, Agent, or Firm* — Foley & Lardner LLP

(57) ABSTRACT

A control device (15) is equipped with a steering angle returning torque target value setting unit (30) which calculates a returning control amount target value (MapOut) based on a vehicle speed (Vs) and a turning angle ($\theta b$), and with a steering angle returning torque command signal calculation unit (31) which calculates a retuning control amount (RetOut) based on the retuning control amount target value (MapOut). The steering angle returning torque command signal calculation unit (31) is equipped with a rate limiter (36). The rate limiter (36) determines a change in the vehicle speed (Vs) from a vehicle speed sensor (19), and gradually increases or decreases the retuning control amount target value (MapOut) at a certain rate and then outputs the returning control amount (RetOut).

9 Claims, 10 Drawing Sheets

(56) References Cited

FOREIGN PATENT DOCUMENTS

| JP | 2018158600 A | * | 10/2018 | | |
| WO | WO-2015119149 A1 | * | 8/2015 | ............ | B62D 5/0409 |
| WO | WO-2015170559 A1 | * | 11/2015 | ......... | B62D 15/0235 |
| WO | WO-2018163724 A1 | * | 9/2018 | ............ | B62D 15/021 |

OTHER PUBLICATIONS

Written Opinion of the International Searching Authority dated Mar. 27, 2018 in International Application No. PCT/JP2018/004979.

* cited by examiner

POWER STEERING APPARATUS

TECHNICAL FIELD

The present invention relates to a power steering apparatus.

BACKGROUND TECHNOLOGY

As a power steering apparatus, for example, a power steering apparatus described in the following patent document 1 has been known.

In the power steering apparatus described in the patent document 1, by calculating a steering angle returning torque control amount from a steering angle gain map for determining a returning torque to an steering angle and a vehicle speed map for increasing and decreasing the returning torque in accordance with a vehicle speed, a handle return control is carried out.

PRIOR ART DOCUMENT

Patent Document

Patent Document 1: Japanese Patent Application Publication 2007-99053

SUMMARY OF THE INVENTION

Problem to be Solved by the Invention

In general, in the vicinity of a rack end in a low vehicle speed range, to compensate the shortage of a self-aligning torque, a steering angle returning torque control amount is set to be large. On the other hand, at the time of the stop of a vehicle, the steering angle retuning torque control amount is usually set to zero. In this case, the steering angle returning torque control amount is rapidly changed when the vehicle speed is changed from the low vehicle speed range to the vehicle stop, and there is the fear that an odd feeling of steering occurs.

However, in the power steering apparatus of the patent document 1, the rapid change of the steering angle returning torque control amount is not concerned, and there is the fear that the odd feeling occurs.

The present invention has been made in a consideration of such a current situation, and an object of the present invention is to provide a power steering apparatus which is capable of suppressing an odd feeling of steering in a low vehicle speed range.

Means for Solving the Problem

In the present invention, as one aspect thereof, the change rate of a steering angle returning torque command signal at the time when a vehicle speed increases from 0 km/h to a first predetermined vehicle speed is smaller than the change rate of the steering angle returning torque command signal at the time when the vehicle speed increases from the first predetermined vehicle speed to a second predetermined vehicle speed.

Effect of the Invention

According to the present invention, an odd feeling of steering in a low vehicle speed range can be suppressed.

MODE FOR IMPLEMENTING THE INVENTION

In the following, one embodiment of a power steering apparatus of the present invention will be explained based on the drawings.

(Configuration of Power Steering Apparatus)

Figure 1:
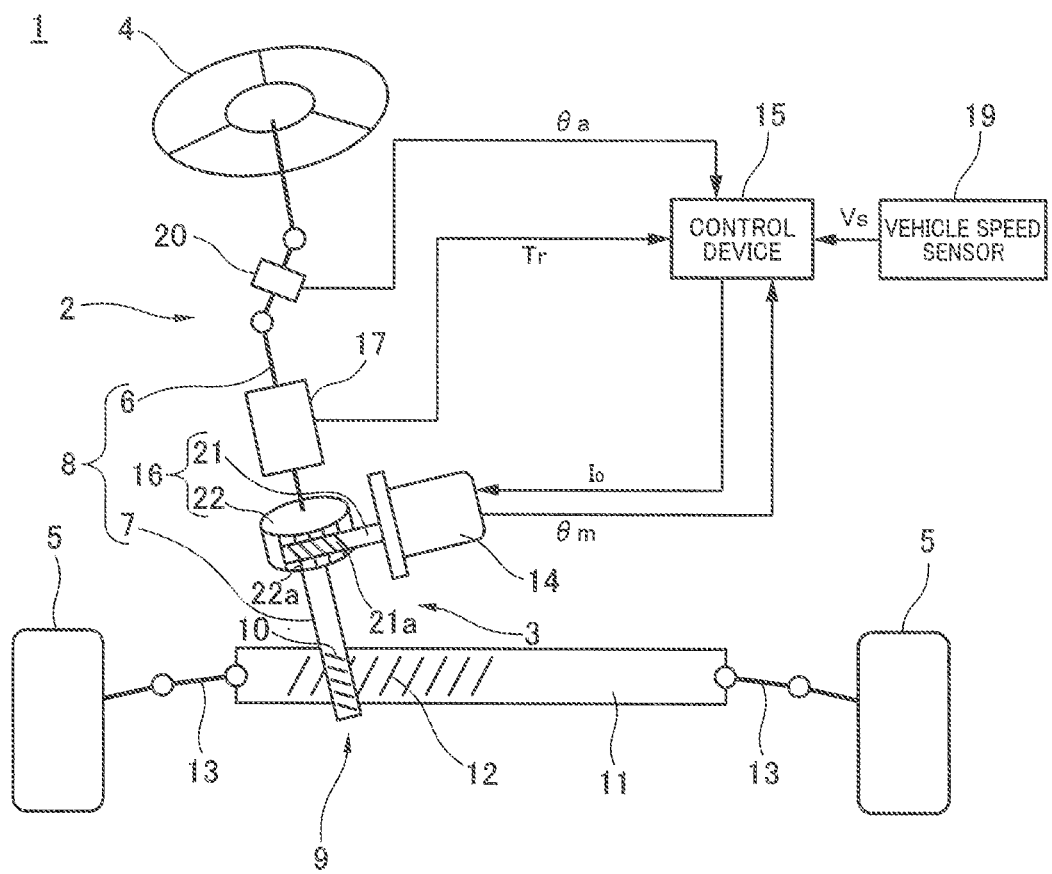
FIG. 1 is a schematic diagram of a power steering apparatus when viewed from the front side of a vehicle.

FIG. 1 is a schematic diagram of a power steering apparatus 1 when viewed from the front side of a vehicle.

As shown in FIG. 1, the power steering apparatus 1 is equipped with a steering mechanism 2 for transmitting a steering force from a driver, and a steering assist mechanism 3 for assisting the steering operation of the driver.

The steering mechanism 2 mechanically connects a steering wheel 4 disposed inside a driving room of a vehicle with two turning wheels 5, 5 that are front wheels of the vehicle. The steering mechanism 2 is equipped with a steering shaft 8 including an input shaft 6 to which a rotation force from the steering wheel 4 is transmitted and an output shaft 7 connected to the input shaft 6 through a torsion bar which is not shown in the drawings, and with a transmission mechanism 9 for transmitting the rotation of the steering shaft 8 to the turning wheels 5, 5. The transmission mechanism 9 is configured of a rack and pinion mechanism (rack and pinion gear) formed of a pinion 10 provided on the outer periphery of the output shaft 7 and a rack 12 provided on the outer periphery of a rack bar 11. Both ends of the rack bar 11 are connected to the respective turning wheels 5, 5 through tie rods 13 and 13 and two knuckle arms which are not shown in the drawings.

The steering assist mechanism 3 is equipped with a motor 14 that is an electric motor for applying a steering assist force to the steering mechanism 2, a control device 15 for driving and controlling the motor 14, and with a worm gear 16 that is a deceleration mechanism (transmission mechanism) for decelerating the rotation of the motor 14.

The motor 14 is a three-phase brushless motor driven by three-phase AC power.

Figure 2:
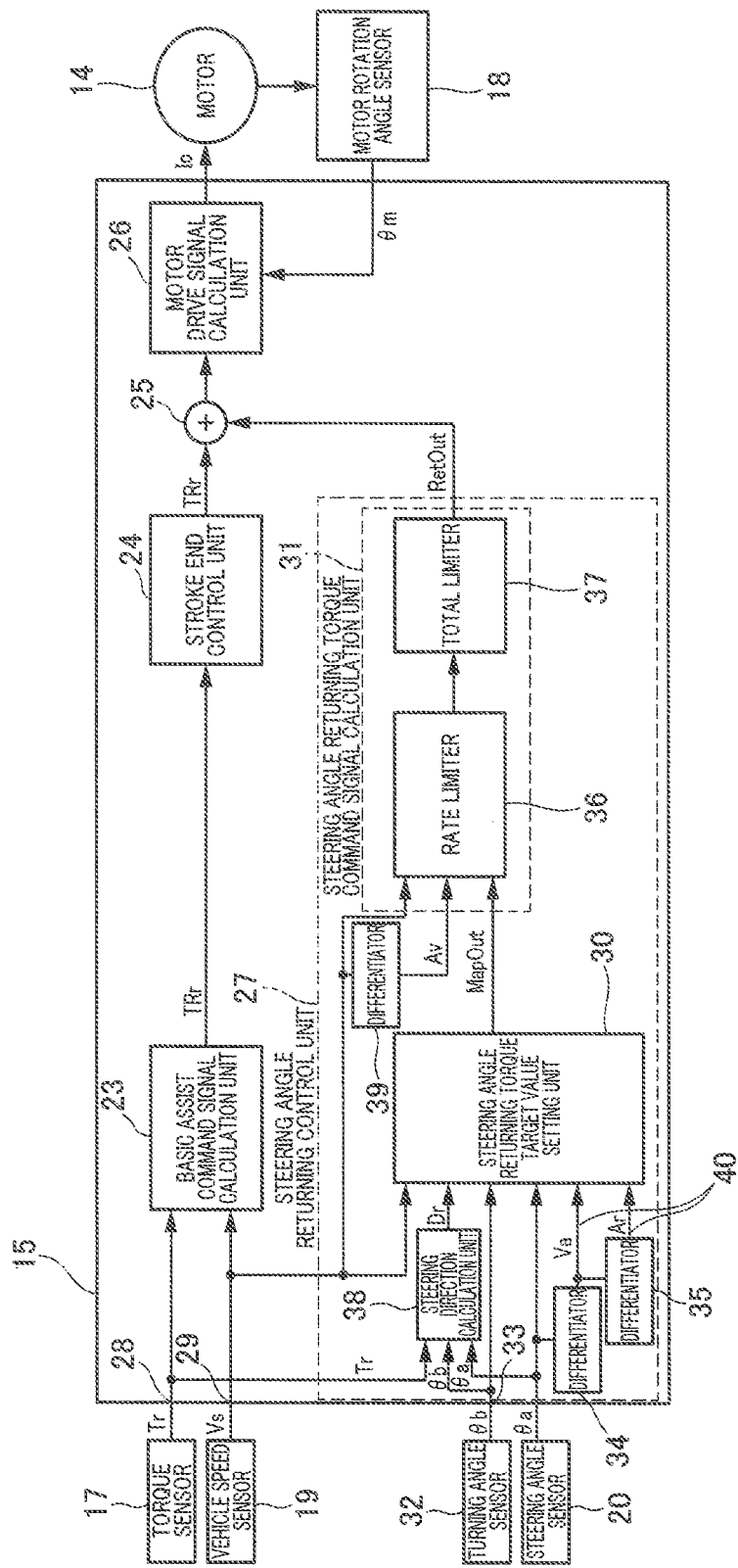
FIG. 2 is a control block diagram of a control device of FIG. 1.

The control device 15 is equipped with electronic parts, such as a microcomputer, and is configured to drive and control the motor 14 with a control current Io calculated based on a steering torque (steering torque signal) Tr from a torque sensor 17 and a motor rotation angle (motor rotation angle signal) $\theta m$ from a motor rotation angle sensor 18 (see FIG. 2). In addition, a vehicle speed (vehicle speed signal) Vs from a vehicle speed sensor 19 and a steering angle (steering angle signal) $\theta a$ from a steering angle sensor 20 are input to the control device 15.

In addition, the steering angle $\theta a$ is not detected by the steering angle sensor 20, but may be calculated by another means such as calculation.

The worm gear 16 transmits the steering assist force (rotation force) output by the motor 14 to the output shaft 7 while decelerating the steering assist force. The worm gear 16 is configured of a worm shaft 21 including a tooth part 21a on the outer periphery thereof and attached to the drive shaft of the motor 14, and of a worm wheel 22 including a tooth part 22a on the outer periphery thereof which meshes with the tooth part 21a, and rotating integrally with the output shaft 7.

According to the configuration of the power steering apparatus 1, when the driver carries out rotation operation of the steering wheel 4, the torsion bar is twisted by the rotation of the input shaft 6, and by the elastic force of the torsion bar generated by the twisting, the output shaft 7 rotates. Then, the rotation motion of the output shaft 7 is converted to linear motion along the axial direction of the rack bar 11 by the above rack and pinion mechanism, and the knuckle arms which are not shown in the drawings are pushed and pulled in the width direction of the vehicle through the tie rods 13, 13, and, consequently, the directions of the corresponding turning wheels 5, 5 are changed.

(Control Block Diagram of Control Device)

FIG. 2 is a control block diagram showing the details of the control configuration of the control device 15.

The control device 15 is equipped with a basic assist command signal calculation unit 23, a stroke end control unit 24, an adder 25, a motor drive signal calculation unit 26 and a steering angle returning control unit 27.

The basic assist command signal calculation unit 23 calculates a basic assist current (basic assist command signal) TRr for driving the motor 14, based on the steering torque Tr detected by the torque sensor 17 and the vehicle speed (car speed) Vs detected by the vehicle speed sensor 19. The torque sensor 17 is electrically connected to a steering torque signal receiving unit 28 for receiving the steering torque Tr from the torque sensor 17, steering torque signal receiving unit which is provided to the control device 15. The vehicle speed sensor 19 is electrically connected to a vehicle speed signal receiving unit 29 for receiving the vehicle speed Vs from the vehicle speed sensor 19, vehicle speed signal receiving unit which is provided to the control device 15. The basic assist current TRr is a command signal for supplying a steering force to the steering mechanism 2 in a direction corresponding to the rotation direction of the steering wheel 4.

The stroke end control unit 24 is provided on the downstream side of the basic assist command signal calculation unit 23. The stroke end control unit 24 is configured to suppress shock and generation of abnormal noise at the time of the butting of the rack by reducing a component which generates a torque in a stroke end direction in a motor command current (motor command signal) Io, in a state in which the after-mentioned turning angle (turning angle signal) $\theta b$ is in a predetermined region. For example, the stroke end control unit 24 applies a component which generates a torque in the direction opposite to the stroke end direction, in order to reduce the component which generates the torque in the stroke end direction in the motor command current Io.

The adder 25 is provided on the downstream side of the stroke end control unit 24, and adds the basic assist current TRr from the basic assist command signal calculation unit 23 and the after-mentioned returning control amount (steering angle returning torque command signal) RetOut and then outputs it to the motor drive signal calculation unit 26.

The motor drive signal calculation unit 26 is provided on the downstream side of the adder 25, and calculates the motor command current Io based on the basic assist current TRr and the returning control amount RetOut. In addition, a motor rotation angle (motor rotation angle signal) $\theta m$ detected by the motor rotation angle sensor 18 provided between the motor 14 and the motor drive signal calculation unit 26 is fed back to the motor drive signal calculation unit 26, and based on this motor rotation angle $\theta m$, the motor command current Io is adjusted.

The steering angle returning control unit 27 is equipped with a steering angle returning torque target value setting unit 30 and a steering angle returning torque command signal calculation unit 31.

The steering angle returning torque target value setting unit 30 sets a retuning control amount target value (steering angle returning torque target value) MapOut of the steering wheel 4, based on the vehicle speed Vs and the turning angle $\theta b$ detected by the turning angle sensor 32. For example, the steering angle returning torque target value setting unit 30 calculates the returning control amount target value MapOut by multiplying a predetermined returning control amount reference value by a retuning control gain K obtained by the after-mentioned map (see FIG. 3). The turning angle sensor 32 is electrically connected to a tuning angle signal receiving unit 33 for receiving the turning angle $\theta b$ detected by the turning angle sensor 32, turning angle signal receiving unit which is provided to the control device 15. The returning control amount target value MapOut is a target value for applying a steering assist force to the steering mechanism 2 in the direction in which the turning wheels 5, 5 are directed to the neutral positions.

In addition, the returning control amount target value MapOut may be calculated by a steering angular velocity Va or the steering torque Tr.

Moreover, the turning angle $\theta b$ is not detected by the turning angle sensor 32, but may be calculated by another means, such as calculation.

In addition, the steering angle returning torque target value setting unit 30 is capable of changing the returning control amount target value MapOut, based on the steering angular velocity (steering angular velocity signal) Va obtained by converting, through a first differentiator 34, the steering angle (steering angle signal) $\theta a$ from the steering angle sensor 20, or a steering angular acceleration (steering angular acceleration signal) Ar obtained by converting, through a second differentiator 35, the steering angular velocity Va from the first differentiator 34.

The first differentiator 34 and the second differentiator 35 are electrically connected to a first steering state signal receiving unit 40 provided to the control device 15.

The steering angle returning torque command signal calculation unit 31 is configured of a rate limiter 36, which is provided on the downstream side of the steering angle returning torque target value setting unit 30, and of a total limiter 37. The total limiter 37 is electrically connected to the adder 25 positioned more on the downstream side than the stroke end control unit 24. The steering angle returning torque command signal calculation unit 31 is one for calculating the returning control amount (steering angle returning torque command signal) RetOut based on the returning control amount target value MapOut, and changes a rate of a change in the returning control amount RetOut which accompanies a change in the vehicle speed Vs. In addition, the steering angle returning torque command signal calculation unit 31 may change the change rate of the returning control amount RetOut which accompanies the change in the vehicle speed Vs in accordance with the magnitude of a vehicle acceleration Av converted through a third differentiator 39. Moreover, the steering angle returning torque command signal calculation unit 31 may change the change rate of the returning control amount RetOut based on the steering angular velocity Va or the steering angular acceleration Ar from the first steering state signal receiving unit 40 provided to the control device 15.

In addition, a steering direction (steering direction signal) Dr that is a signal of the rotation direction of the steering wheel 4 is input to the steering angle returning control unit 27 from a steering direction calculation unit 38. The steering direction Dr is calculated from the relation between the steering angle θa or the turning angle θb and the steering torque Tr.

The steering angle returning torque command signal calculation unit 31 is also capable of calculating the returning control amount RetOut based on the steering direction Dr such that the retuning control amount RetOut has the same characteristic between the turning state in which the steering wheel 4 is turned from the neutral position toward the stroke end and the turning state in which the steering wheel 4 is turned from the stroke end toward the neutral position.

The rate limiter 36 is provided on the downstream side of the steering angle returning torque target value setting unit 30. The rate limiter 36 determines the change in the vehicle speed Vs from the vehicle speed sensor 19, and gradually increases or decreases the returning control amount target value MapOut at a certain rate. The rate limiter 36 outputs the returning control amount RetOut such that the change rate of the returning control amount RetOut, which accompanies the change in the vehicle speed Vs, becomes a predetermined rate or less. In addition, the rate limiter 36 is capable of outputting the returning control amount RetOut such that the change amount of the returning control amount RetOut per a predetermined unit time, which accompanies the change in the vehicle speed Vs, becomes a predetermined amount or less. Moreover, the rate limiter 36 is also capable of outputting the returning control amount RetOut such that the change amount of the returning control amount RetOut per a predetermined vehicle speed change amount, which accompanies the change in the vehicle speed Vs, becomes a predetermined amount or less.

The total limiter 37 is provided on the downstream side of the rate limiter 36, and sets the returning control amount target value MapOut to be carried out the gradual increase processing so as not to exceed a predetermined upper limit value. In addition to this, the total limiter 37 sets the returning control amount target value MapOut to be carried out the gradual decrease processing so as not to be lower than a predetermined lower limit value.

Figure 3:
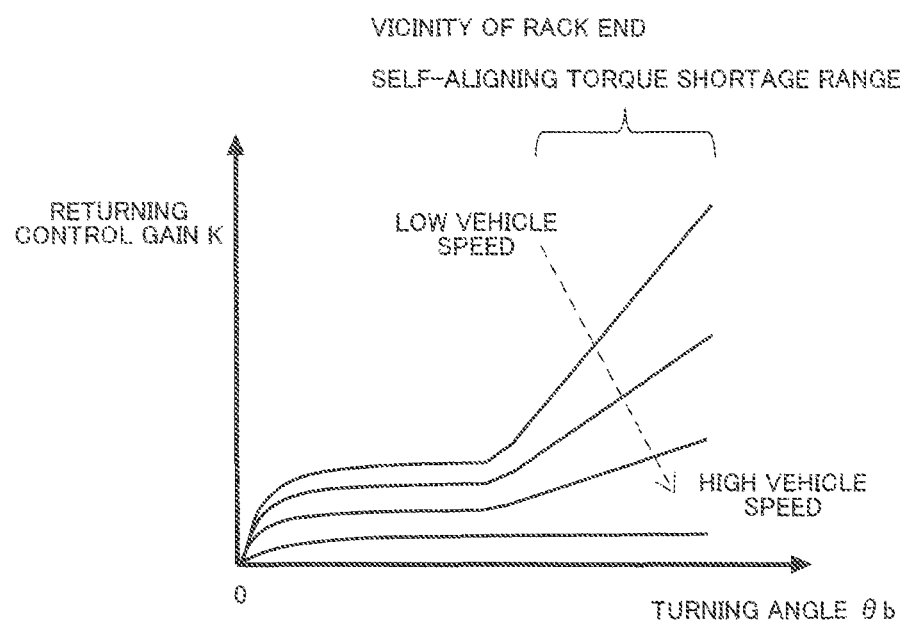
FIG. 3 is a map showing the correlation of a turning angle, a vehicle speed, and a returning control gain.

FIG. 3 is a map showing the correlation of the turning angle θb, the vehicle speed Vs and a returning control gain K, which is used for the calculation of the returning control amount target value MapOut in the steering angle returning torque target value setting unit 30.

As shown in FIG. 3, in the vicinity of the rack end in a low vehicle speed range in which a self-aligning torque is small, namely, in a range in which the vehicle speed Vs is, for example, 1 km/h, the retuning control gain K is large in order to suppress returning difficulty of the steering wheel 4 by compensating shortage of the self-aligning torque.

On the other hand, in a high vehicle speed range in which the self-aligning torque becomes large, the returning control gain K is small to suppress excessive returning of the steering wheel 4.

In addition, when the vehicle stops, namely, the vehicle speed Vs is 0 km/h, the returning control gain K is zero because there is no necessity for the returning of the steering wheel 4. If the returning control gain K was set to be large, the problem of heating of the control device 15 and the problem of power management of the vehicle would occur because, in a low μ road in which a load applied to the rack is extremely small or in a lift-up situation, the steering wheel 4 freely moves without operation by hands, or current always flows even when the steering wheel 4 does not move.

The returning control amount RetOut calculated by using such a map becomes zero or a value close to zero when the vehicle speed Vs is 0 km/h. On the other hand, it becomes a large value when the vehicle speed Vs is 1 km/h.

For example, when the vehicle speed Vs increases from 0 km/h to 1 km/h at the time of vehicle starting in a state of being turned to the vicinity of the rack end, the returning control amount RetOut suddenly increases. Then, there is fear that by carrying out a returning control based on the sudden change of the returning control amount RetOut, the steering wheel 4 is suddenly returned, and odd feelings of steering, such as a sudden increase in a steering force, occur.

In addition, there is fear that when the vehicle speed Vs decreases from 1 km/h to 0 km/h at the time of the stopping of the vehicle, since the returning control amount RetOut suddenly becomes zero, a steering force is weakened, and an odd feeling of steering in which the steering wheel 4 is turned at the same time of the stopping of the vehicle occurs.

In the present embodiment, by reducing the change rate of the returning control amount RetOut to the change in the returning control amount target value MapOut, the rapid change of the returning control amount RetOut at the time of the starting and stopping of the vehicle is reduced, and the odd feeling of the steering of the driver is suppressed. That is, the rate limiter processing is carried out to the returning control amount target value MapOut in the rate limiter 36 based on the change in the vehicle speed Vs, and by gradually increasing or decreasing the returning control amount target value MapOut, the rapid change of the returning control amount RetOut is reduced, thereby suppressing the odd feeling of the steering of the driver.

For example, in a state in which the turning angle θb is in a predetermined region including the stroke end, when the vehicle speed Vs increases from 0 km/h to 1 km/h, the rate limiter 36 gradually increases the returning control amount target value MapOut. In other words, in a state in which the turning angle θb is in a predetermined region including the stroke end, the steering angle returning torque command signal calculation unit 31 calculates the returning control amount RetOut such that the change rate of the returning control amount RetOut which accompanies the change in the vehicle speed Vs when the vehicle speed Vs increases from 0 km/h to 1 km/h becomes smaller than the change rate of the returning control amount RetOut which accompanies the change in the vehicle speed Vs when the vehicle speed Vs increases from 1 km/h to a vehicle speed larger than 1 km/h.

On the other hand, when the vehicle speed Vs is reduced from 1 km/h to 0 km/h, the rate limiter 36 gradually decreases the returning control amount target value MapOut.

In addition, in the present embodiment, although the vehicle speed Vs in which the self-alignment torque in the vicinity of the rack end in a low vehicle speed range is shortened is defined as "1 km/h" and the present embodiment is explained, this vehicle speed Vs differs according to vehicles (specifications), and it is set to an optional vehicle speed with a vehicle speed of 20 km/h as an upper limit, and then the present embodiment can be applied.

In addition, the above vehicle speed of 20 km/h corresponds to a "first predetermined vehicle speed" described in the scope of the claims, and a predetermined vehicle speed larger than 20 km/h corresponds to a "second predetermined vehicle speed" described in the scope of the claims.

Figure 4:
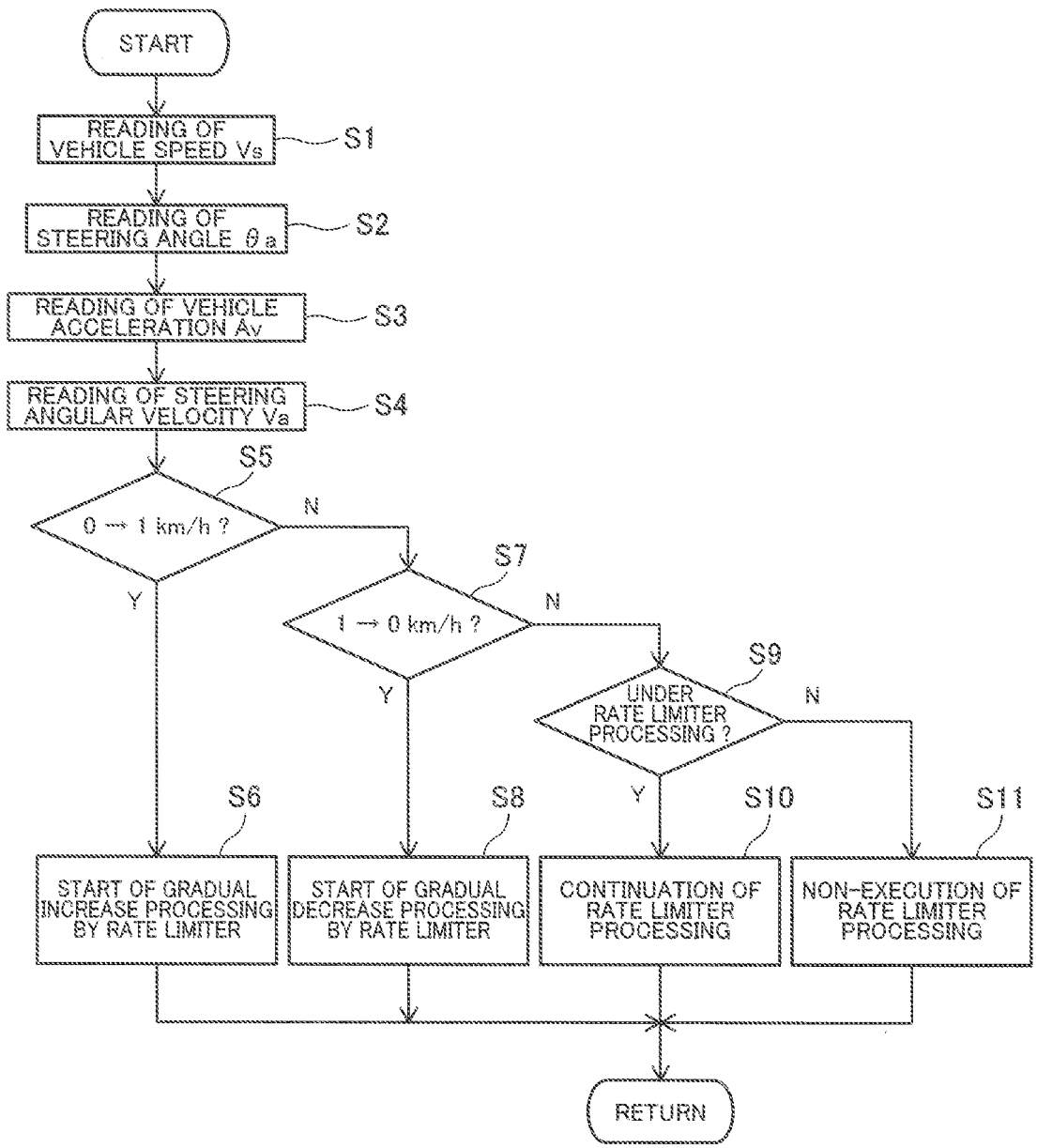
FIG. 4 is a flowchart showing a transition determination to a rate limiter processing in a steering angle returning torque command signal calculation unit.

FIG. 4 is a flowchart showing a transition determination to a rate limiter processing in the rate limiter 36.

In a step S1, the vehicle speed Vs from the vehicle speed sensor 19 is read.

In a step S2, the steering angle θa from the steering angle sensor 20 is read.

In a step S3, the vehicle acceleration Av output through the third differentiator 39 is read.

In a step S4, the steering angular velocity Va output through the second differentiator 35 is read.

Then, in a step S5, it is determined whether or not the vehicle speed Vs increases from 0 km/h to 1 km/h. When the vehicle speed Vs increases from 0 km/h to 1 km/h, the process proceeds to a step S6, and the rate limiter 36 gradually increases the returning control amount target value MapOut.

In addition, when, in the step S5, the vehicle speed Vs does not increase from 0 km/h to 1 km/h, in a step 7, it is determined whether or not the vehicle speed Vs decreases from 1 km/h to 0 km/h. When the vehicle speed Vs decreases from 1 km/h to 0 km/h, the process proceeds to a step S8, and the rate limiter 36 gradually decreases the returning control amount target value MapOut.

When, in the step S7, the vehicle speed Vs does not decrease from 1 km/h to 0 km/h, in a step S9, it is determined whether or not the rate limiter processing is continued. When the rate limiter processing is continued, the process proceeds to a step S10, and the rate limiter processing is continued.

In addition, when, in the step S9, the rate limiter processing is not continued, the process proceeds to a step S11, and the rate limiter processing is not carried out.

Figure 5:
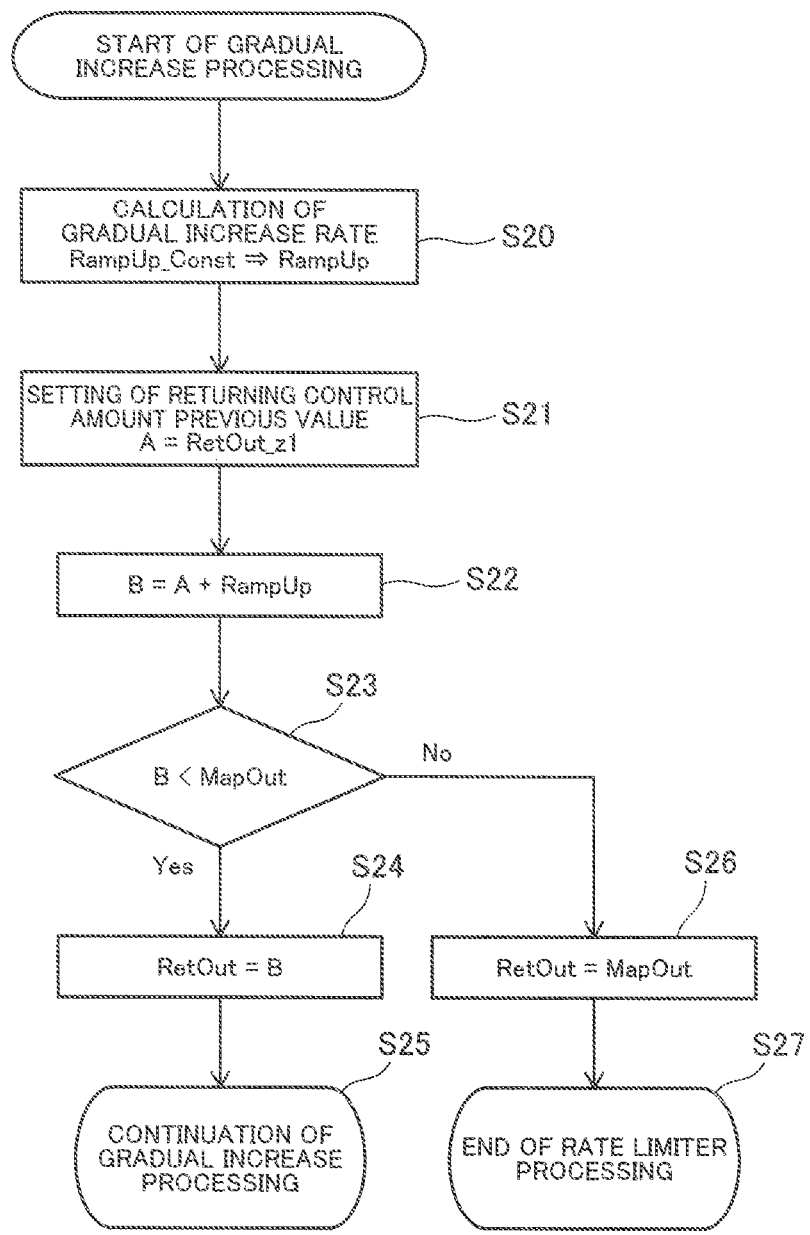
FIG. 5 is a flowchart showing a gradual increase processing by a rate limiter.

FIG. 5 is a flowchart showing a gradual increase processing by the rate limiter 36.

In a step S20, a gradual increase rate RampUp is calculated. The gradual increase rate RampUp is calculated by multiplying a gradual increase rate constant value RampUp_Const by various weighting factors α, β, γ and δ respectively obtained by the after-mentioned weighting factor maps (A) to (D).

In a step S21, a returning control amount previous value RetOut_z1 is set to "A". The above gradual increase processing is a processing in a case where the vehicle speed Vs increases from 0 km/h to 1 km/h, and when the vehicle speed Vs is 0 km/h, the returning control amount is not necessary, and the "A" is set to zero (A=0).

Then, in a step S22, a limit value B is calculated by adding the gradual increase rate RampUp to "A".

In a step S23, it is determined whether or not the limit value B is smaller than the returning control amount target value MapOut. When the limit value B is smaller than the returning control amount target value MapOut, in a step S24, the limit value B is set to the retuning control amount RetOut, and in a step S25, the gradual increase processing by the rate limiter 36 is continued.

In addition, in the step S23, when the limit value B is equal to the returning control amount target value MapOut or greater, in a step S26, the returning control amount target value MapOut is set to the returning control amount RetOut, and, in a step S27, the rate limiter processing is ended.

FIG. 6(A) is a map showing the correlation of the vehicle speed Vs and the weighting factor α by which the gradual increase rate constant value RampUp_Const is multiplied.

When the vehicle speed Vs is large, the steering wheel 4 needs to be quickly returned, and as shown in FIG. 6(A), the weighting factor α is set to be high when the vehicle speed Vs is large.

FIG. 6(B) is a map showing the correlation of the vehicle acceleration Av and the weighting factor β by which the gradual increase rate constant value RampUp_Const is multiplied.

When the vehicle acceleration Av is large, it is necessary to complement the response delay of the returning control amount RetOut, and as shown in FIG. 6(B), the weighting factor β is set to be high when the vehicle acceleration Av is large.

FIG. 6(C) is a map showing the correlation of the steering angle θa and the weighting factor γ by which the gradual increase rate constant value RampUp_Const is multiplied.

If the returning control amount RetOut is set to a large amount when the steering angle θa is large, the steering wheel 4 is suddenly largely returned, and steering feeling deteriorates. Therefore, as shown in FIG. 6(C), the weighting factor γ is set to be small when the steering angle θa is large.

Figure 6:
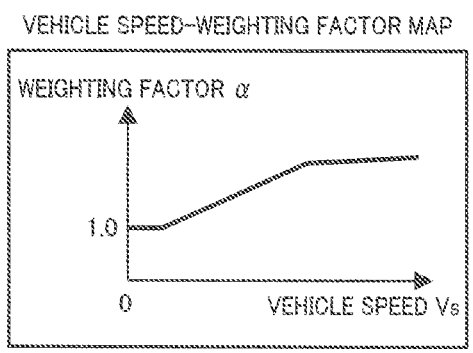
FIG. 6(A) is a map showing the correlation of a vehicle speed and a weighting factor.
FIG. 6(B) is a map showing the correlation of a vehicle acceleration and a weighting factor.
FIG. 6(C) is a map showing the correlation of a steering angle and a weighting factor.
FIG. 6(D) is a map showing the correlation of a steering angular velocity and a weighting factor.
Figure 6:
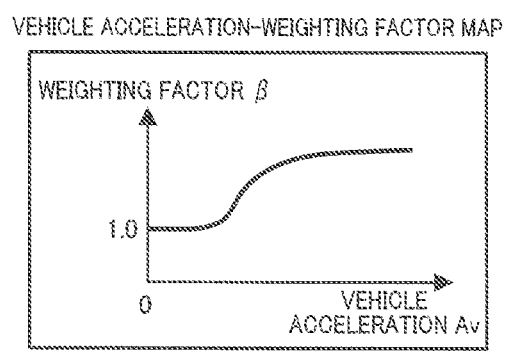
Figure 6:
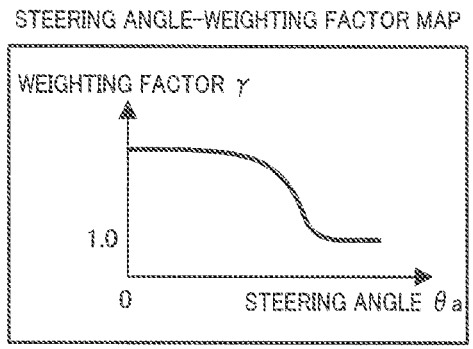
Figure 6:
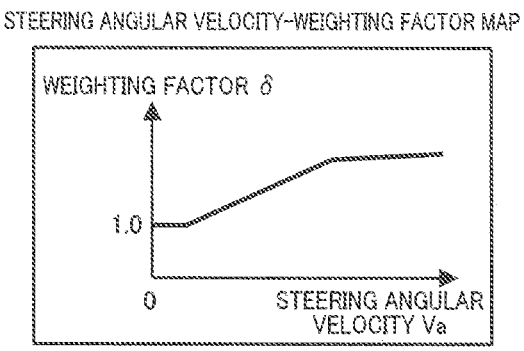

FIG. 6 (D) is a map showing the correlation of the steering angular velocity Va and the weighting factor δ by which the gradual increase rate constant value RampUp_Const is multiplied.

When the steering angular velocity Va is large, it is necessary to rapidly return the steering wheel 4, and as shown in FIG. 6 (D), the weighting factor δ is set to be high when the steering angular velocity Va is large.

In addition, the weighting factors α, β, γ and δ respectively obtained from FIG. 6 (A), FIG. 6 (B), FIG. 6 (C) and FIG. 6 (D) are also used at the time when the after-mentioned gradual decrease rate RampDown is calculated.

Figure 7:
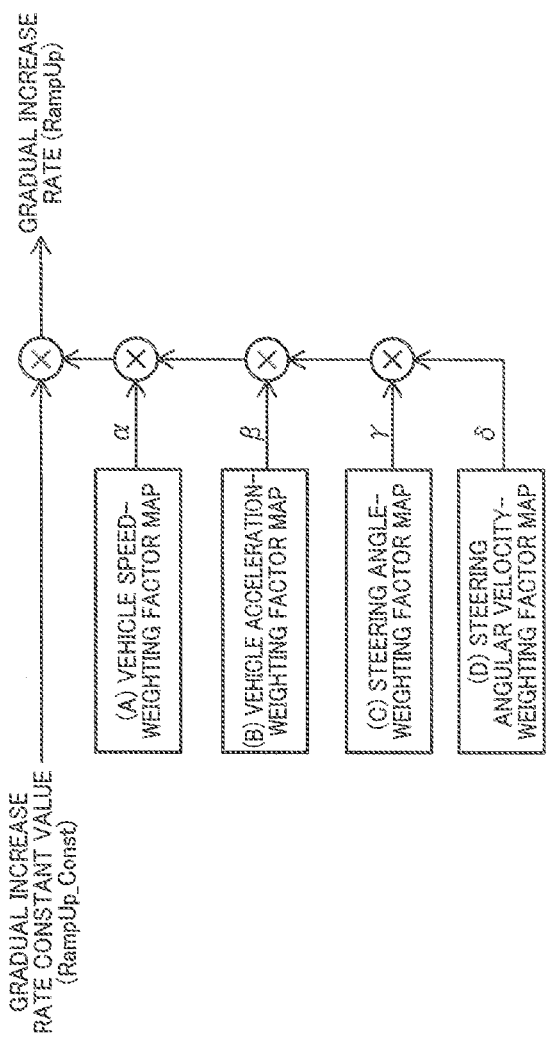
FIG. 7 is an explanatory view showing a method for calculating a gradual increase rate.

FIG. 7 is an explanatory view showing a method for calculating the gradual increase rate RampUp from the gradual increase rate constant value RampUp_Const.

As shown in FIG. 7, the gradual increase rate constant value RampUp_Const is multiplied by the weighting factors α, β, γ and δ respectively obtained from FIG. 6 (A) to FIG. 6 (D).

Figure 8:
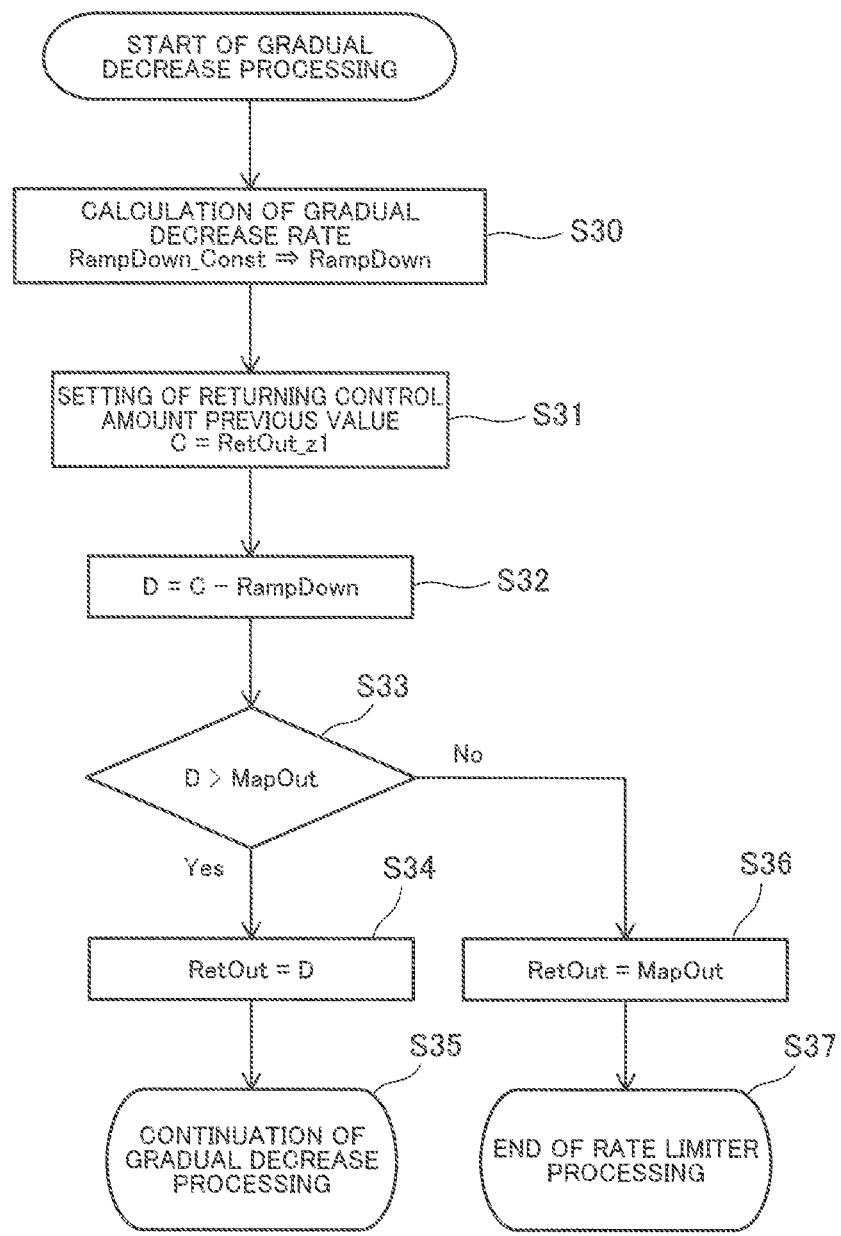
FIG. 8 is a flowchart showing a gradual decrease processing by the rate limiter.

FIG. 8 is a flowchart showing the gradual decrease processing by the rate limiter 36.

In a step S30, the gradual decrease rate RampDown is calculated. The gradual decrease rate RampDown is calculated by multiplying the gradual decrease rate constant value RampDown_Const by various weighting factors $\alpha$, $\beta$, $\gamma$ and $\delta$ obtained by the weighting factor maps of FIG. 6 (A) to FIG. 6 (D).

In a step S31, the returning control amount previous value RetOut_z1 is set to "C".

Then, in a step S32, the gradual decrease rate RampDown is subtracted from the "C", and a limit value D is calculated.

In a step S33, it is determined whether or not the limit value D is larger than the returning control amount target value MapOut. When the limit value D is larger than the returning control amount target value MapOut, in a step S34, the limit value D is set to the returning control amount RetOut, and in a step S35, the gradual decreasing processing by the rate limiter 36 is continued.

In addition, when the limit value D is equal to the returning control amount target value MapOut or less, in a step S36, the returning control amount target value MapOut is set to the returning control amount RetOut, and in a step S37, the rate limiter processing is ended.

Figure 9:
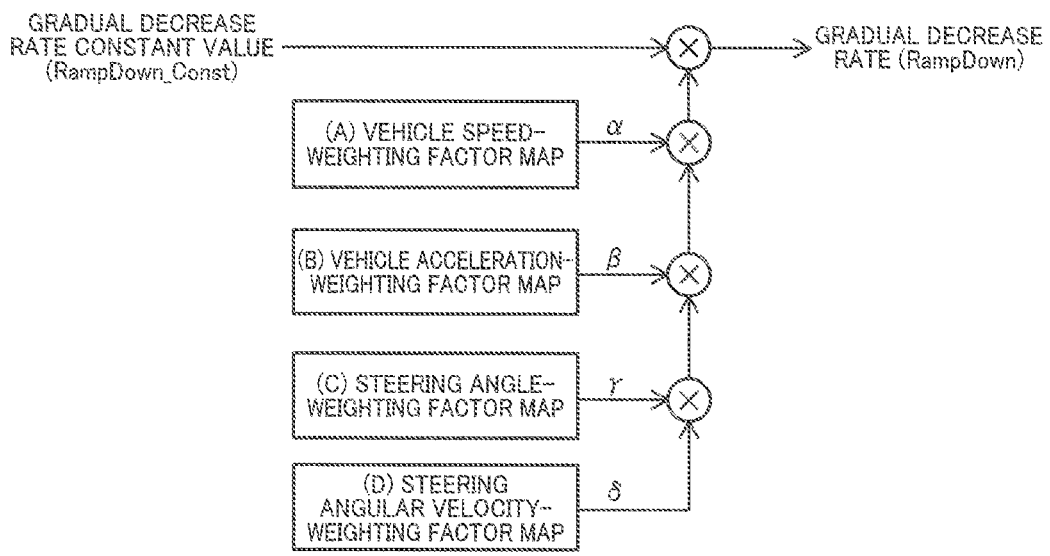
FIG. 9 is an explanatory view showing a method for calculating a gradual decrease rate.

FIG. 9 is an explanatory view showing a method for calculating the gradual decrease rate RampDown from the gradual decrease rate constant value RampDown_Const.

As shown in FIG. 9, the gradual decrease rate constant value RampDown_Const is multiplied by the weighting factors $\alpha$, $\beta$, $\gamma$ and $\delta$ obtained from the maps of FIG. 6 (A) to FIG. 6 (D).

Figure 10:
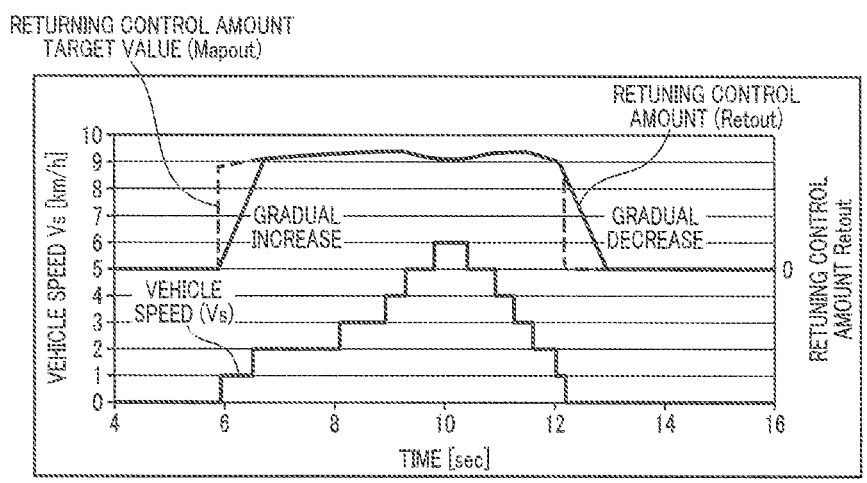
FIG. 10 is a graph showing changes in a returning control amount target value and a returning control amount at the time of the start and the stop of a vehicle.

FIG. 10 is a graph showing changes in the returning control amount target value MapOut and the returning control amount RetOut at the time of the start and the stop of the vehicle. In FIG. 10, a solid line on the upper stage indicates the returning control amount RetOut, and a solid line on the lower stage indicates the vehicle speed Vs. In addition, in FIG. 10, a broken line indicates the returning control amount target value MapOut. Here, in FIG. 10, although a part of the returning control amount target value MapOut shown by the broken line is shown, the other part overlaps with the returning control amount RetOut which is shown by the solid line. In addition, in FIG. 10, the turning angle θb is in a predetermined region including the stroke end.

As show in FIG. 10, when the vehicle speed Vs is 0 km/h, the returning control amount target value MapOut is zero or a value close to zero. Then, when the vehicle steed Vs increases from 0 km/h to 1 km/h at the time of the start of the vehicle, the returning control amount target value MapOut is set to a high value rapidly. The returning control amount RetOut output based on such a high returning control amount target value MapOut increases largely. In contrast to this, in the present embodiment, by carrying out the gradual increase processing, when the vehicle speed Vs increases from 0 km/h to 1 km/h, the returning control amount RetOut gradually increases at an increasing rate smaller than that of the returning control amount target value MapOut.

In addition, when the vehicle speed decreases from 1 km/h to 0 km/h at the time of the stop of the vehicle, the retuning control amount target value MapOut is set to a low value rapidly. The returning control amount RetOut output based on such a low retuning control amount target value MapOut decreases largely. In contrast to this, in the present embodiment, by carrying out the gradual decrease processing, when the vehicle speed Vs decreases from 1 km/h to 0 km/h, the returning control amount RetOut gradually decreases at a decreasing rate smaller than that of the returning control amount target value MapOut.

[Effects of the Present Embodiment]

Figure 11:
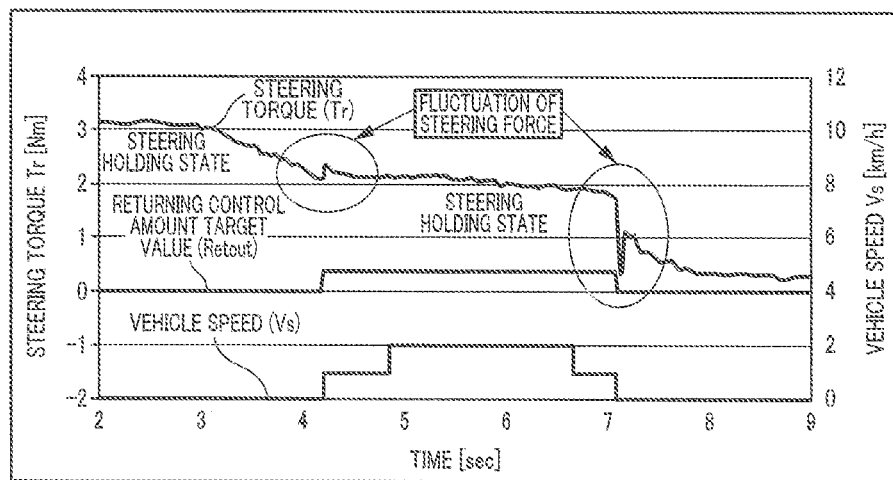
FIG. 11 is a graph showing a change in a steering torque at the time of the start and the stop of the vehicle in a case where the rate limiter processing is not carried out to the returning control amount target value.

FIG. 11 is a graph showing a change in the steering torque Tr at the time of the start and the stop of the vehicle in a case where the rate limiter processing is not carried out to the returning control amount target value MapOut. In FIG. 11, the turning angle θb is in a predetermined region including the stroke end, and the steering wheel 4 becomes a steering holding state.

As shown in FIG. 11, in a case where the rate limiter processing is not carried out to the returning control amount target value MapOut, as the returning control amount RetOut, the returning control amount target value MapOut is output to the adder 25 (see FIG. 2).

As shown in FIG. 11, when the vehicle speed Vs is 0 km/h, the returning control amount RetOut is zero or a value close to zero. Then, when the vehicle speed Vs increases from 0 km/h to 1 km/h at the time of the start of the vehicle, the returning control amount RetOut increases stepwise. Consequently, as shown by surrounding it with a solid line circle in FIG. 11, the steering torque Tr rapidly increases.

As a result of that, by the rapid increase of the returning torque, an odd feeling that a steering force suddenly increases occurs.

On the other hand, when the vehicle speed Vs decreases from 1 km/h to 0 km/h at the time of the stop of the vehicle, the returning control amount RetOut decreases stepwise. Consequently, as shown by surrounding it with a solid line ellipse in FIG. 11, the steering torque Tr rapidly decreases at a variation larger than that at the time of the start of the vehicle from 0 km/h to 1 km/h.

As a result of that, by the rapid decrease of the returning torque, the steering force is weakened, and an odd feeling that the steering wheel 4 at the same time of the stop of the vehicle turns occurs.

Figure 12:
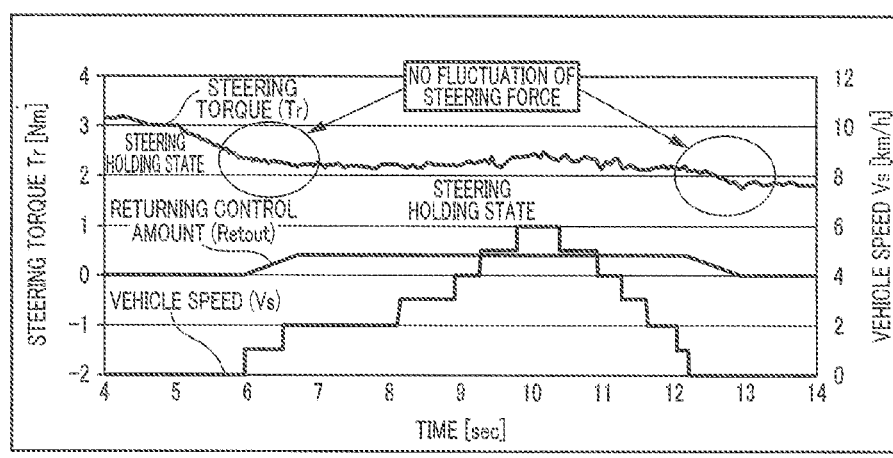
FIG. 12 is a graph showing a change in a steering torque at the time of the start and the stop of the vehicle in a case where the rate limiter processing is carried out to the returning control amount target value.

FIG. 12 is a graph showing a change in the steering torque Tr at the time of the start and the stop of the vehicle in a case where the rate limiter processing is carried out to the returning control amount target value MapOut. In FIG. 12, the steering angle θb is in a predetermined region including the stroke end, and the steering wheel 4 becomes a steering holding state.

As shown in FIG. 12, when the rate limiter processing is carried out to the returning control amount target value MapOut, the returning control amount RetOut obtained by carrying out the rate limiter processing to the retuning control amount target value MapOut is output to the adder 25 (see FIG. 2).

As shown in FIG. 12, when the vehicle speed Vs is 0 km/h, the returning control amount RetOut is zero or a value close to zero. Then, when the vehicle speed Vs increases from 0 km/h to 1 km/h at the time of the start of the vehicle, the returning control amount RetOut gradually increases by the gradual increase processing. Consequently, as shown by a left-side solid line circle surrounding it in FIG. 12, the steering torque Tr remains almost flat without occurrence of a large fluctuation, and the fluctuation of the steering torque Tr is suppressed more than the fluctuation at the time of the start of the vehicle shown in FIG. 11.

As shown in FIG. 11, the returning control amount RetOut rapidly increases. However, in this way, as shown in FIG. 12, by gradually increasing the retuning control amount RetOut by the rate limiter processing, the fluctuation of the steering torque Tr is suppressed, and thereby the occurrence of an add feeling that the steering wheel 4 is suddenly returned and the steering force increases suddenly is suppressed.

On the other hand, when the vehicle speed Vs decreases from 1 km/h to 0 km/h at the time of the stop of the vehicle, by the gradual decrease processing, the retuning control amount RetOut gradually decreases. Consequently, although, as shown by a right-side solid line circle surrounding it in FIG. 12, the steering torque Tr decreases somewhat, the fluctuation of the steering torque Tr becomes smaller than the fluctuation at the time of the stop of the vehicle shown in FIG. 11.

As shown in FIG. 11, the returning control amount RetOut rapidly decreases. However, in this way, as shown in FIG. 12, by gradually decreasing the retuning control amount RetOut by the rate limiter processing, the fluctuation of the steering torque Tr is suppressed, and thereby the occurrence of an odd feeling that the steering wheel 4 is turned at the same time of the stop of the vehicle caused by the reduction of the steering force is suppressed.

As the above, in the present embodiment, a power steering apparatus 1 includes: a steering mechanism 2 for transmitting rotation of a steering wheel 4 to turning wheels 5, 5; an electric motor 14 for applying a steering force to the steering mechanism 2; a control device 15 for driving and controlling the electric motor 14; a steering torque signal receiving unit 28 for receiving a steering torque signal that is a signal of a steering torque Tr generated in the steering mechanism 2, the steering torque signal receiving unit which is provided to the control device 15; a basic assist command signal calculation unit 23 that is a basic assist command signal calculation unit 23 for calculating a basic assist current TRr based on the steering torque Tr, and which is provided to the control device 15, wherein the basic assist current TRr is a command signal for applying the steering force to the steering mechanism 2 in a direction corresponding to a rotation direction of the steering wheel 4; a vehicle speed signal receiving unit 29 for receiving a vehicle speed Vs, the vehicle speed signal receiving unit which is provided to the control device 15; a turning angle signal receiving unit 33 for receiving a turning angle signal that is a signal relating to a turning angle θb of the turning wheels 5, 5, the turning angle signal receiving unit which is provided to the control device 15; a steering angle returning torque target value setting unit 30 that is a steering angle returning torque target value setting unit 30 for setting a returning control amount target value MapOut based on the vehicle speed Vs and the turning angle θb, and which is provided to the control device 15, wherein the returning control amount target value MapOut is a target value for applying the steering force to the steering mechanism 2 in a direction in which the turning wheels 5, 5 are directed to neutral positions; a steering angle returning torque command signal calculation unit 31 that is a steering angle returning torque command signal calculation unit 31 for calculating a returning control amount RetOut based on the returning control amount target value Map Out, and which calculates the returning control amount RetOut such that a change rate of the returning control amount RetOut which accompanies a change in the vehicle speed Vs at the time when the vehicle speed Vs increases from 0 km/h to a first predetermined vehicle speed becomes smaller than a change rate of the returning control amount RetOut which accompanies a change in the vehicle speed Vs at the time when the vehicle speed Vs increases from the first predetermined vehicle speed to a second predetermined vehicle speed in a state in which the turning angle θb is in a predetermined region including a stroke end, when the first predetermined vehicle speed is defined as a vehicle speed higher than 0 km/h and the second predetermined vehicle speed is defined as a vehicle speed higher than the first predetermined vehicle speed, the steering angle returning torque command signal calculation unit which is provided to the control device 15; and a motor drive signal calculation unit 26 for calculating a motor command current Io that is a signal for driving and controlling the electric motor 14, based on the basic assist current TRr and the returning control amount RetOut, the motor drive signal calculation unit which is provided to the control device 15.

Therefore, it is possible to suppress an odd feeling of steering while obtaining the returning control amount RetOut as needed.

Moreover, in the present embodiment, the control device 15 is equipped with a stroke end control unit 24 for reducing a component which generates a torque in a stroke end direction in the motor command current Io, in a state in which the turning angle θb is in the predetermined region, and the steering angle returning torque command signal calculation unit 31 is provided more on a downstream side than the stroke end control unit 24. For example, the stroke end control unit 24 acts a component which generates a torque in a direction opposite to the stroke end direction, in order to reduce the component which generates the torque in the stroke direction in the motor command current Io.

If the stroke end control unit 24 was provided on the downstream side of the steering angle returning torque command signal calculation unit 31, the returning control amount RetOut which acts as a component which generates the torque in the opposite direction would be subtracted by the stroke-end control. Consequently, a brake cannot be applied in the stroke end direction efficiently, and the steering angular velocity toward the stroke end cannot be reduced sufficiently, as a result of which odd feelings of steering, such as shock and abnormal noise at the time of the butting of the ruck occur.

In contrast to this, by providing the steering angle returning torque command signal calculation unit 31 more on the downstream side than the stroke end control unit 24 like the present embodiment, the returning control amount RetOut is not reduced, and thereby an odd feeling of the steering can be suppressed.

In addition, in the present embodiment, the steering angle returning torque command signal calculation unit 31 calculates the returning control amount RetOut such that the change rate of the returning control amount RetOut, which accompanies the change in the vehicle speed Vs, becomes a predetermined rate or less.

In this way, by carrying out a so-called rate limiter processing such that the change rate becomes a predetermined rate or less, the change in the returning control amount RetOut which is larger than a predetermined rate is suppressed. Consequently, the rapid change in the steering torque is suppressed, and an odd feeling of the steering can be suppressed.

Moreover, in the present embodiment, the control device 15 is equipped with a steering direction calculation unit 38 for calculating the rotation direction of the steering wheel 4, and the steering angle returning torque command signal calculation unit 31 calculates the returning control amount RetOut such that the returning control amount RetOut has the same characteristic between a turning state in which the steering wheel 4 is turned from a neutral position side toward a stroke end direction and a turning state in which the steering wheel 4 is turned from the stroke end direction toward the neutral position side.

Therefore, it is possible to suppress an odd feeling of the steering caused by the change in a steering feeling between a turning state and a returning state.

In addition, the steering angle returning torque command signal calculation unit 31 is capable of changing the change rate of the returning control amount RetOut, which accompanies the change in the vehicle speed Vs, in accordance with a magnitude of a vehicle acceleration Av.

In this way, by changing the change rage of the retuning control amount RetOut accompanying the change in the vehicle speed Vs in accordance with the vehicle acceleration Av, for example, the response delay of the returning control amount RetOut at the time of rapid acceleration can be improved.

Moreover, the control device 15 is equipped with a first steering state signal receiving unit 40 for receiving a steering angular velocity Va that is a signal of a rotation velocity of the steering wheel 4, or a steering angular acceleration Ar that is a signal of a rotation angular acceleration of the steering wheel 4. With this, in addition to the calculation of the returning control amount target value MapOut based on the vehicle speed Vs and the turning angle θb, and to the calculation of the returning control amount RetOut, the steering angle returning torque target value setting unit 30 is capable of changing the returning control amount target value MapOut, based on the steering angular velocity Va or the steering angular acceleration Ar, and the steering angle returning torque command signal calculation unit 31 is capable of changing the returning control amount RetOut, based on the steering angular velocity Va or the steering angular acceleration Ar.

In this way, by calculating the returning control amount target value MapOut based on the information regarding the steering, and calculating the returning control amount RetOut by carrying out the rate limiter processing in accordance with the returning control amount target value MapOut, an odd feeling of the steering can be further suppressed.

In addition, the steering angle retuning torque command signal calculation unit 31 is capable of not only simply calculating the returning control amount RetOut such that a change amount of the returning control amount RetOut which accompanies the change in the vehicle speed Vs becomes a predetermined amount or less, but also calculating the returning control amount RetOut such that a change amount of the returning control amount RetOut per a predetermined unit time becomes a predetermined amount or less.

In this way, by limiting the change amount of the returning control amount RetOut per unit time, rapid change of the returning control amount RetOut is suppressed more efficiently, and thereby the odd feeling of the steering can be suppressed.

Moreover, the steering angle retuning torque command signal calculation unit 31 is capable of not only simply calculating the returning control amount RetOut such that a change amount of the returning control amount RetOut which accompanies the change in the vehicle speed Vs becomes a predetermined amount or less, but also calculating the returning control amount RetOut such that a change amount of the returning control amount RetOut per a predetermined vehicle speed change amount, which accompanies the change in the vehicle speed Vs, becomes a predetermined amount or less.

Therefore, the change in the characteristic of the returning control amount RetOut at the time when the change in the vehicle speed Vs is small can be suppressed.

As a power steering apparatus based on the embodiment explained above, for example, the following aspects can be considered.

A power steering apparatus, as one aspect thereof, includes: a steering mechanism for transmitting rotation of a steering wheel to turning wheels; an electric motor for applying a steering force to the steering mechanism; a control device for driving and controlling the electric motor; a steering torque signal receiving unit for receiving a steering torque signal that is a signal of a steering torque generated in the steering mechanism, the steering torque signal receiving unit which is provided to the control device; a basic assist command signal calculation unit that is a basic assist command signal calculation unit for calculating a basic assist command signal based on the steering torque signal, and which is provided to the control device, wherein the basic assist command signal is a command signal for applying the steering force to the steering mechanism in a direction corresponding to a rotation direction of the steering wheel; a vehicle speed signal receiving unit for receiving a vehicle speed signal, the vehicle speed signal receiving unit which is provided to the control device; a turning angle signal receiving unit for receiving a turning angle signal that is a signal relating to a turning angle of the turning wheels, the turning angle signal receiving unit which is provided to the control device; a steering angle returning torque target value setting unit that is a steering angle returning torque target value setting unit for setting a steering angle returning torque target value based on the vehicle speed signal and the turning angle signal, and which is provided to the control device, wherein the steering angle returning torque target value is a target value for applying the steering force to the steering mechanism in a direction in which the turning wheels are directed to neutral positions; a steering angle returning torque command signal calculation unit that is a steering angle returning torque command signal calculation unit for calculating a steering angle returning torque command signal based on the steering angle returning torque target value, and which calculates the steering angle returning torque command signal such that a change rate of the steering angle returning torque command signal which accompanies a change in the vehicle speed at a time when the vehicle speed increases from 0 km/h to a first predetermined vehicle speed becomes smaller than a change rate of the steering angle returning torque command signal which accompanies a change in the vehicle speed at a time when the vehicle speed increases from the first predetermined vehicle speed to a second predetermined vehicle speed in a state in which the turning angle signal is in a predetermined region including a stroke end, when the first predetermined vehicle speed is defined as a vehicle speed higher than 0 km/h and the second predetermined vehicle speed is defined as a vehicle speed higher than the first predetermined vehicle speed, the steering angle returning torque command signal calculation unit which is provided to the control device; and a motor drive signal calculation unit for calculating a motor command signal that is a signal for driving and controlling the electric motor, based on the basic assist command signal and the steering angle returning torque command signal, the motor drive signal calculation unit which is provided to the control device.

In a preferable aspect of the power steering apparatus, the steering angle returning torque command signal calculation unit gradually decreases the steering angle returning torque command signal, when the vehicle speed decreases from the first predetermined vehicle speed to 0 km/h.

In another preferable aspect, in any of the aspects of the power steering apparatus, the steering angle returning torque command signal calculation unit changes the change rate of the steering angle returning torque command signal, which accompanies the change in the vehicle speed, in accordance with a magnitude of a vehicle acceleration.

In another preferable aspect, in any of the aspects of the power steering apparatus, the control device is equipped with a steering state signal receiving unit for receiving a steering angular velocity signal that is a signal of a rotation velocity of the steering wheel, or a steering angular acceleration signal that is a signal of a rotation angular acceleration of the steering wheel, the steering angle returning torque target value setting unit changes the steering angle returning torque target value, based on the steering angular velocity signal or the steering angular acceleration signal, and the steering angle returning torque command signal calculation unit changes the steering angle retuning torque command signal, based on the steering angular velocity signal or the steering angular acceleration signal.

In another preferable aspect, in any of the aspects of the power steering apparatus, the control device is equipped with a stroke end control unit for reducing a component which generates a torque in a stroke end direction in the motor command signal, in a state in which the turning angle signal is in the predetermined region, and the steering angle returning torque command signal calculation unit is provided more on a downstream side than the stroke end control unit.

In another preferable aspect, in any of the aspects of the power steering apparatus, the steering angle returning torque command signal calculation unit calculates the steering angle returning torque command signal such that the change rate of the steering angle returning torque command signal, which accompanies the change in the vehicle speed, becomes a predetermined rate or less.

In another preferable aspect, in any of the aspects of the power steering apparatus, the steering angle retuning torque command signal calculation unit calculates the steering angle returning torque command signal such that a change amount of the steering angle returning torque command signal per a predetermined unit time, which accompanies the change in the vehicle speed, becomes a predetermined amount or less.

In another preferable aspect, in any of the aspects of the power steering apparatus, the steering angle retuning torque command signal calculation unit calculates the steering angle returning torque command signal such that a change amount of the steering angle returning torque command signal per a predetermined vehicle speed change amount, which accompanies the change in the vehicle speed, becomes a predetermined amount or less.

In another preferable aspect, in any of the aspects of the power steering apparatus, the control device is equipped with a steering direction calculation unit for calculating the rotation direction of the steering wheel, and the steering angle returning torque command signal calculation unit calculates the steering angle returning torque command signal such that the steering angle returning torque command signal has the same characteristic between a turning state in which the steering wheel is turned from a neutral position side toward a stroke end direction and a turning state in which the steering wheel is turned from the stroke end direction toward the neutral position side.

The invention claimed is:
1. A power steering apparatus, comprising:
a steering mechanism for transmitting rotation of a steering wheel to turning wheels;
an electric motor for applying a steering force to the steering mechanism;
a control device for driving and controlling the electric motor;
a steering torque signal receiving unit for receiving a steering torque signal that is a signal of a steering torque generated in the steering mechanism, the steering torque signal receiving unit which is provided to the control device;
a basic assist command signal calculation unit that is a basic assist command signal calculation unit for calculating a basic assist command signal based on the steering torque signal, and which is provided to the control device, wherein the basic assist command signal is a command signal for applying the steering force to the steering mechanism in a direction corresponding to a rotation direction of the steering wheel;
a vehicle speed signal receiving unit for receiving a vehicle speed signal, the vehicle speed signal receiving unit which is provided to the control device;
a turning angle signal receiving unit for receiving a turning angle signal that is a signal relating to a turning angle of the turning wheels, the turning angle signal receiving unit which is provided to the control device;
a steering angle returning torque target value setting unit that is a steering angle returning torque target value setting unit for setting a steering angle returning torque target value based on the vehicle speed signal and the turning angle signal, and which is provided to the control device, wherein the steering angle returning torque target value is a target value for applying the steering force to the steering mechanism in a direction in which the turning wheels are directed to neutral positions;
a steering angle returning torque command signal calculation unit that is a steering angle returning torque command signal calculation unit for calculating a steering angle returning torque command signal based on the steering angle returning torque target value, and which calculates the steering angle returning torque command signal such that a change rate of the steering angle returning torque command signal which accompanies a change in the vehicle speed at a time when the vehicle speed increases from 0 km/h to a first predetermined vehicle speed becomes smaller than a change rate of the steering angle returning torque command signal which accompanies a change in the vehicle speed at a time when the vehicle speed increases from the first predetermined vehicle speed to a second predetermined vehicle speed in a state in which the turning angle signal is in a predetermined region including a stroke end, when the first predetermined vehicle speed is defined as a vehicle speed higher than 0 km/h and the second predetermined vehicle speed is defined as a vehicle speed higher than the first predetermined vehicle speed, the steering angle returning torque command signal calculation unit which is provided to the control device; and
a motor drive signal calculation unit for calculating a motor command signal that is a signal for driving and controlling the electric motor, based on the basic assist command signal and the steering angle returning torque command signal, the motor drive signal calculation unit which is provided to the control device.

2. The power steering apparatus according to claim 1, wherein the steering angle returning torque command signal calculation unit gradually decreases the steering angle returning torque command signal, when the vehicle speed decreases from the first predetermined vehicle speed to 0 km/h.

3. The power steering apparatus according to claim 1, wherein the steering angle returning torque command signal calculation unit changes the change rate of the steering angle returning torque command signal, which accompanies the change in the vehicle speed, in accordance with a magnitude of a vehicle acceleration.

4. The power steering apparatus according to claim 1, wherein the control device is equipped with a steering state signal receiving unit for receiving a steering angular velocity signal that is a signal of a rotation velocity of the steering wheel, or a steering angular acceleration signal that is a signal of a rotation angular acceleration of the steering wheel,
  wherein the steering angle returning torque target value setting unit changes the steering angle returning torque target value, based on the steering angular velocity signal or the steering angular acceleration signal, and
  wherein the steering angle returning torque command signal calculation unit changes the steering angle retuning torque command signal, based on the steering angular velocity signal or the steering angular acceleration signal.

5. The power steering apparatus according to claim 1, wherein the control device is equipped with a stroke end control unit for reducing a component which generates a torque in a stroke end direction in the motor command signal, in a state in which the turning angle signal is in the predetermined region, and
  wherein the steering angle returning torque command signal calculation unit is provided more on a downstream side than the stroke end control unit.

6. The power steering apparatus according to claim 1, wherein the steering angle returning torque command signal calculation unit calculates the steering angle returning torque command signal such that the change rate of the steering angle returning torque command signal, which accompanies the change in the vehicle speed, becomes a predetermined rate or less.

7. The power steering apparatus according to claim 6, wherein the steering angle retuning torque command signal calculation unit calculates the steering angle returning torque command signal such that a change amount of the steering angle returning torque command signal per a predetermined unit time, which accompanies the change in the vehicle speed, becomes a predetermined amount or less.

8. The power steering apparatus according to claim 6, wherein the steering angle retuning torque command signal calculation unit calculates the steering angle returning torque command signal such that a change amount of the steering angle returning torque command signal per a predetermined vehicle speed change amount, which accompanies the change in the vehicle speed, becomes a predetermined amount or less.

9. The power steering apparatus according to claim 1, wherein the control device is equipped with a steering direction calculation unit for calculating the rotation direction of the steering wheel, and
  wherein the steering angle returning torque command signal calculation unit calculates the steering angle returning torque command signal such that the steering angle returning torque command signal has the same characteristic between a turning state in which the steering wheel is turned from a neutral position side toward a stroke end direction and a turning state in which the steering wheel is turned from the stroke end direction toward the neutral position side.

* * * * *